United States Patent
Yang

(10) Patent No.: US 7,546,754 B2
(45) Date of Patent: Jun. 16, 2009

(54) METHOD OF FABRICATING TUBULAR STRUCTURE FROM HYBRID MATERIAL

(75) Inventor: Wuhua Yang, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 586 days.

(21) Appl. No.: 11/106,114

(22) Filed: Apr. 14, 2005

(65) Prior Publication Data

US 2006/0233979 A1    Oct. 19, 2006

(51) Int. Cl.
    *B23P 17/00* (2006.01)
(52) U.S. Cl. .................. 72/61; 72/58; 72/62; 29/421.1
(58) Field of Classification Search .................. 72/56, 72/57, 58, 59, 60, 61, 62, 367.1, 370.22; 29/421.1
    See application file for complete search history.

(56) References Cited

U.S. PATENT DOCUMENTS

| | | | | |
|---|---|---|---|---|
| 3,028,667 A * | 4/1962 | Wintermute et al. | ....... | 29/469.5 |
| 3,340,714 A * | 9/1967 | Pohl et al. | .................. | 72/342.4 |
| 4,061,139 A * | 12/1977 | Kauffmann | ..................... | 72/56 |
| 4,238,540 A * | 12/1980 | Yates et al. | ................. | 428/35.9 |
| 4,347,722 A * | 9/1982 | Ulam | ............................ | 72/63 |
| 4,729,806 A * | 3/1988 | Stein | ......................... | 72/367.1 |
| 5,170,557 A * | 12/1992 | Rigsby | .......................... | 72/61 |
| 5,836,065 A * | 11/1998 | Dehlinger et al. | ........... | 29/33 T |
| 6,065,211 A * | 5/2000 | Birkert | ......................... | 72/62 |
| 6,242,069 B1 | 6/2001 | Hillier | | |
| 6,267,830 B1 * | 7/2001 | Groll | .......................... | 148/531 |
| 6,497,030 B1 * | 12/2002 | Marando | ................... | 29/421.1 |
| 6,523,884 B2 | 2/2003 | Czaplicki et al. | | |
| 6,532,641 B2 | 3/2003 | Hillier | | |
| 6,626,351 B2 | 9/2003 | Dziadosz et al. | | |
| 6,668,457 B1 * | 12/2003 | Czaplicki | ................... | 29/897.1 |
| 6,693,251 B1 | 2/2004 | Ananthanarayanan et al. | | |
| 6,723,175 B2 | 4/2004 | Hanakawa et al. | | |
| 7,047,615 B2 * | 5/2006 | Norek | ........................ | 29/421.1 |
| 7,051,768 B2 * | 5/2006 | Takahashi | ...................... | 72/61 |

* cited by examiner

*Primary Examiner*—David B Jones

(57) ABSTRACT

A method allowing for the fabrication of tubular structures, such as structural members used in vehicle bodies, from two or more metals or other materials using a hydroforming process. Being able to use two or more metals or other materials, such as, for example, high-strength steel and low-weight aluminum alloy, in body structure design allows for achieving an optimum material solution which combines the desirable attributes of the different materials.

3 Claims, 2 Drawing Sheets

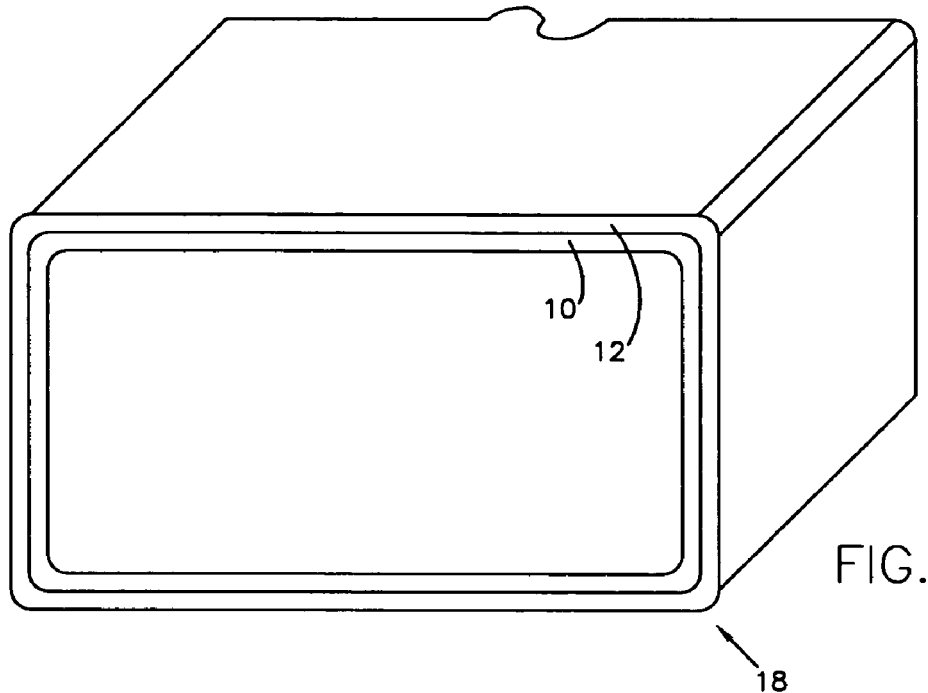

Associating a first metal or other material with a second metal or other material in an initial form.

202

Pre-conditioning the initial form, as necessary or desired, such as, for example, by introducing one or more structural features or by treating the initial form chemically or thermally.

204

Subjecting the initial form to a hydroforming process to produce a tubular structure or other final form, wherein the hydroforming process may include positioning the inital form relative to a die and applying pressure to the initial form so that it conforms to a surface of the die.

FIG. 4

METHOD OF FABRICATING TUBULAR STRUCTURE FROM HYBRID MATERIAL

TECHNICAL FIELD

The present invention relates to systems and methods for shaping materials using a hydroforming process. More specifically, the present invention concerns a method allowing for the fabrication of structural members, such as tubular structural members used in vehicle bodies, from two or more metals or other materials using a hydroforming process, and thereby achieving an optimum material solution which combines the desirable attributes of the different materials.

BACKGROUND OF THE INVENTION

It has long been known to use punch-and-die technology to form a part into a desired shape. More specifically, the die provides the desired shape, and the punch is used to force the material of the part to conform to the shape of the die and thereby transfer the shape to the material.

More recently, a process of hydroforming has been developed and used in which fluid pressure performs the function of the conventional punch in forcing the material to conform to the shape of the die. The hydroforming process advantageously allows for producing parts or other components as single structures that would otherwise have been made from multiple stampings joined together. Producing a part as a single structure rather than multiple joined structures allows for substantial weight savings by eliminating flanges necessary for welding, fastening, or otherwise joining the multiple structures, and by using thinner steel or other material while maintaining overall stiffness through the elimination of discontinuous spot-welded joints. Producing a part as a single structure also allows for substantial labor savings by eliminating the labor required to weld, fasten, or otherwise join the multiple structures.

Hydroformed tubular structures, such as are used in the automotive industry, are formed from a single material such as mild steel or an aluminum alloy. Because both mild steel and aluminum alloys each have particular inherent characteristics with respect to such factors as, for example, weight, density, strength, flexural stiffness, and cost, it can be difficult to satisfy often conflicting requirements in body structure design when only a single material is used.

Thus, a method of producing a tubular structure from two or more materials is needed.

SUMMARY OF THE INVENTION

The present invention provides a method allowing for the fabrication of structural members, such as tubular structural members used in vehicle bodies, from two or more metals or other materials, and thereby achieving an optimum material solution which combines the desirable attributes of the different materials.

Broadly, the two or more materials are provided in an initial form. As may be necessary or desired, the initial form can be appropriately pre-formed or otherwise pre-conditioned. The initial form, whether or not pre-formed or pre-conditioned, is subjected to a hydroforming process to impart or otherwise provide a final tubular form. The hydroforming process comprises positioning the initial form relative to a die cavity and applying pressure to the initial form so as to force it against a surface of the die cavity and thereby impart to the initial form a shape of that surface.

Thus, it will be understood and appreciated that the present invention provides a number of advantages over the prior art, including, for example, allowing for the use of two or more materials in novel designs for tubular structures, particularly for automobile or other vehicular applications, wherein the use of multiple materials allows for optimizing such properties as weight, density, strength, flexural stiffness, and cost of the body structures. Such optimization is more difficult or impossible to achieve in prior art designs because they are limited to using a single material.

These and other features of the present invention are discussed in greater detail in the section below titled DESCRIPTION OF THE PREFFERED EMBODIMENT(S).

BRIEF DESCRIPTION OF THE DRAWINGS

A preferred embodiment of the present invention is described in detail below with reference to the attached drawing figures, wherein:

FIG. 3 is an isometric view of an end portion of a final tubular form comprising the two or more materials; and FIG. 4 is a flowchart of steps involved in practicing a preferred embodiment of the method of the present invention.

DESCRIPTION OF THE PREFERRED EMBODIMENT(S)

With reference to the figures, a method is herein described and otherwise disclosed in accordance with a preferred embodiment of the present invention. Broadly, the present invention allows for the fabrication of structures, such as tubular structural members used in vehicle bodies, from two or more metals or other materials. Being able to use two or more metals or other materials, such as, for example, high-strength steel and low-weight aluminum alloy, in body structure design allows for achieving an optimum material solution which combines the desirable attributes of the different materials.

Figure 1:
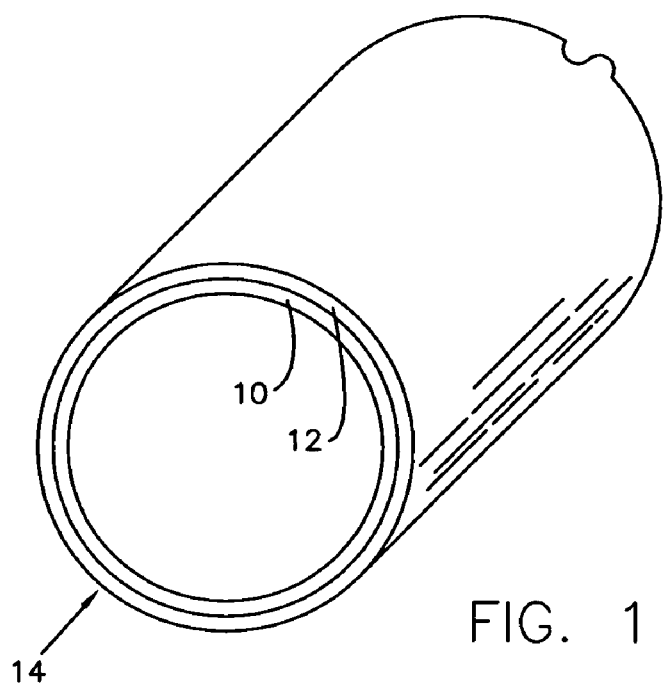
FIG. 1 is an isometric view of an end portion of an initial form comprising two or more materials.

In a preferred embodiment, the fabrication method proceeds broadly as follows. Two or more materials 10,12 are provided in an initial form 14, as shown in FIG. 1 and indicated in box 200 of FIG. 4. Each of the materials 10,12 may be, for example, a metal; a substantially natural non-metal, such as, for example, rubber; or a substantially synthetic non-metal, such as, for example, carbon fiber. As necessary or desired, such materials may be formulated, positioned, or otherwise appropriately adapted so as to be sufficiently flexible or otherwise amenable to shaping via the hydroforming process. The materials 10,12 may be individually fabricated and then stacked or otherwise physically associated to provide the initial form 14, or may be fabricated together so as to be more fully integrated within the initial form 14. The initial form 14 may have any necessary or desired initial shape, such as, for example, a round tubular shape. A particular initial shape may be more conducive to use with the subsequent hydroforming process.

As may be necessary or desired, the initial form 14 can be appropriately pre-formed or otherwise pre-conditioned, as indicated in box 202. Such pre-forming or pre-conditioning may include, for example, introducing one or more initial or preparatory bends or other structural features or combination of structural features into the initial form 14; chemically treating all or some portion of the initial form 14 so as to, for example, enhance corrosion resistance or otherwise protect one or more of the materials 10,12; or thermally treating all or some portion of the initial form so as to, for example, enhance some property of or bonding between the materials 10,12.

Figure 2:
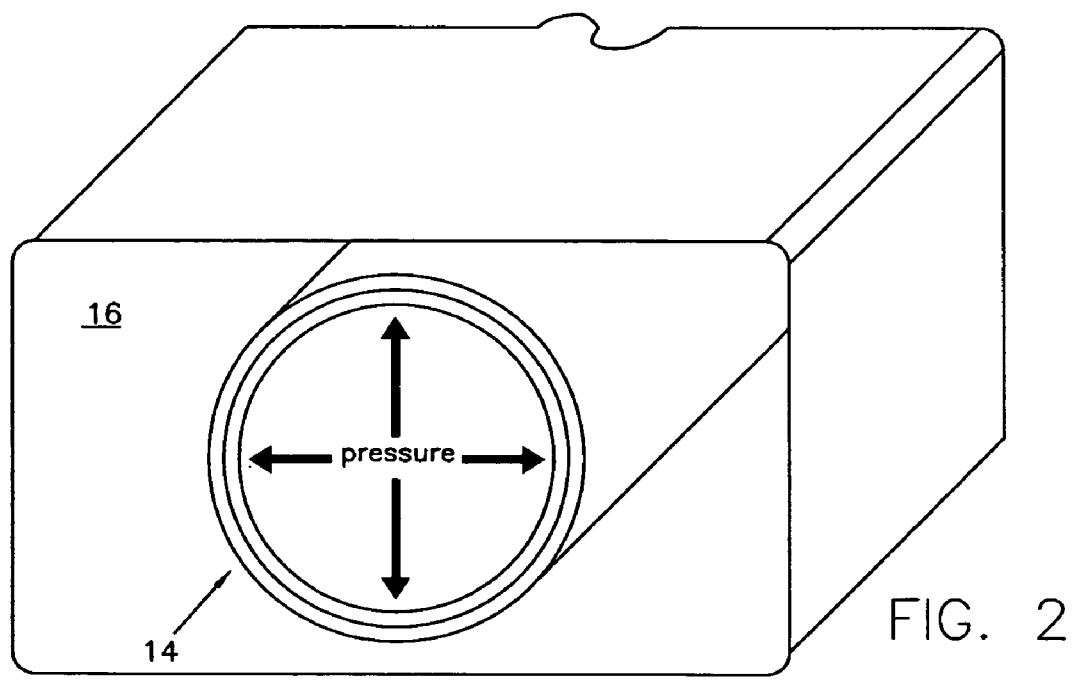
FIG. 2 is an isometric view of an end portion of the initial form positioned within a die cavity.

Then, the initial form 14, which may or may not have been pre-formed or pre-conditioned, is subjected to the hydroforming process to provide a final tubular form 18, as shown in FIGS. 2 and 3 and indicated in box 204. The hydroforming process comprises positioning the initial form 14 relative to a die cavity 16 and applying pressure to the initial form 14 so as to force it against a surface of the die cavity 16 and thereby impart to the initial form 14 a shape of that surface, thereby resulting in the final form 18. Normally, a liquid, such as, for example, water, a water-based solution, or a polymer solution, is forced into an otherwise sealed interior area of the initial form 14 until a sufficient outward pressure is reached, causing the initial form 14 to be physically forced against and shaped by the surface of the die cavity 16. The magnitude of the outward force will depend on a variety of factors, including the nature and properties of the materials 10,12 and the shape to which they are being forced to conform. Furthermore, it is contemplated that low-pressure, high-pressure, or other hydroforming techniques may be used without departing from the scope of the present invention. The final form 18 may have substantially any simple or complex shape which can be imparted through the hydroforming process.

From the preceding discussion it will be understood and appreciated that the present invention provides a number of advantages over the prior art, including, for example, allowing for the use of two or more materials in novel designs for tubular structures, particularly for automobile or other vehicular applications, wherein the use of multiple materials allows for optimizing such properties as weight, density, strength, flexural stiffness, and cost of the body structures. Such optimization is not possible in prior art designs because they are limited to using a single material.

Although the invention has been described with reference to the preferred embodiments illustrated in the drawings, it is noted that equivalents may be employed and substitutions made herein without departing from the scope of the invention as recited in the claims.

The invention claimed is:

1. A method of fabricating a structure from two or more materials, the method comprising the steps of:
    (a) associating a first material with a second material in an initial form and pre-conditioning the form, wherein pre-conditioning the form includes a treatment selected from the group consisting essentially of pre-forming, introducing one or more preparatory bend within, thermally treating, chemically treating, enhancing the corrosion resistance of, and enhancing bonding between the materials of, the form; and
    (b) subjecting, after pre-conditioning, the initial form to a hydroforming process to produce the structure, wherein the hydroforming process includes positioning the pre-conditioned initial form relative to a die, and applying pressure to the initial form so that the first and second materials conform to the die, wherein the pressure is either low or high based upon the materials, wherein at least one of the first and second materials is a substantially natural non-metal material.

2. The method as set forth in claim 1, further including the step of pre-conditioning the initial form by introducing a plurality of structural features into the initial form prior to subjecting the initial form to the hydroforming process.

3. A method of fabricating a structure from two or more materials, the method comprising the steps of:
    (a) associating a first material with a second material in an initial form and pre-conditioning the form, wherein pre-conditioning the form includes a treatment selected from the group consisting essentially of pre-forming, introducing one or more preparatory bend within, thermally treating, chemically treating, enhancing the corrosion resistance of, and enhancing bonding between the materials of, the form; and
    (b) subjecting, after pre-conditioning, the initial form to a hydroforming process to produce the structure, wherein the hydroforming process includes positioning the pre-conditioned initial form relative to a die, and applying pressure to the initial form so that the first and second materials conform to the die, wherein the pressure is either low or high based upon the materials, wherein at least one of the first and second materials is carbon fiber.

* * * * *